3,655,639
Patented Apr. 11, 1972

3,655,639
MONOAZO DYESTUFFS CONTAINING AN ALKOXY TRIAZINE
Henri Riat, Arlesheim, and Fritz Oesterlein, Basel, Switzerland, assignors to Ciba Geigy AG, Basel, Switzerland
No Drawing. Filed May 13, 1969, Ser. No. 824,315
Claims priority, application Switzerland, May 17, 1968, 7,296/68
Int. Cl. C09b 62/08
U.S. Cl. 260—153          11 Claims

ABSTRACT OF THE DISCLOSURE

Monoazo dyestuffs of the formula

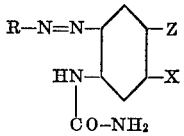

in which R represents a trisulphonic acid naphthyl-(2) residue, Z represents a hydrogen atom or a low-molecular alkyl or alkoxy group and X represents the residue of a 4-chloro- (or-bromo) - 2 - alkoxy - 1,3,5-triazine bound through an —NH— bridge.

The present invention provides monoazo dyestuffs of the formula

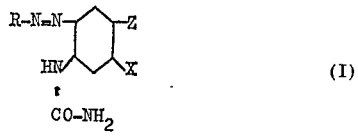    (I)

in which R represents a trisulphonic acid naphthyl-(2) residue, Z represents a hydrogen atom or a low-molecular alkyl or alkoxy group and X represents the residue of a 2-alkoxy-4-chloro- (or -bromo)-1,3,5-triazine bound through an —NH— bridge. The present invention especially provides monoazo dyestuffs of the kind defined in which the alkoxy residue is derived from an aliphatic alcohol of low molecular weight especially a secondary alcohol, or from a monoether of a dialcohol.

The present invention also provides a process for preparing the dyestuffs of the above Formula I, with comprises condensing a 2-alkoxy-4,6-dichloro- (or -dibromo)-1,3,5-triazine, especially 2-(1-methylethoxy)-4,6-dichloro-1,3,5-triazine, with an aminomonoazo dyestuff of the formula

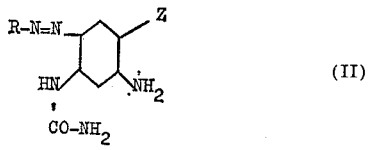    (II)

in which R and Z have the meanings given above, in a manner such that triazine condensation products containing one halogen atom are formed.

The following are given as examples of alkoxydihalogeno triazines that can be used in the process of the present invention:

4,6-dichloro- (or -dibromo)-2-methoxy,
-2-ethoxy-,
-2-propyloxy-,
-2-butyloxy-,
-2-(2-methylpropyloxy)-,
-2-pentyloxy-,
-2-(3-methylbutyloxy)-,
-2-(2-methylbutyloxy)-,
-2-hexyloxy-,
-2-(2,2-dimethylpentyloxy)-,
-2-(2-chloroethoxy)-,
-2-(3-chloropropyloxy)-,
-2-(2-methoxyethoxy)-,
-2-(2-ethoxyethoxy)-,
-2-(2-butyloxyethoxy)-,
-2-(3-methoxybutyloxy)-,
2-[2-(2-methoxyethoxy)-ethoxy]-,
-2-(2-ethoxyethoxymethoxy)-,
-2-(2-ethylmercaptoethoxy)-,
-2-(2-phenoxyethoxy)-,
-2-cyclohexylmethoxy-,
-2-(2-acetyloxyethoxy)-,
-2-furfuryloxy-,
-2-tetrahydrofurfuryloxy-,
-2-(2-buten-1-oxy)-,
-2-carboxymethoxy-,
-2-(1-methylethoxy)-,
-2-(1-methylpropyloxy)-,
-2-(1-methylpentyloxy)-,
-2-(1-ethoxymethyl-2-ethoxyethoxy)-,
-2-(1,2-dimethylpropyloxy)-,
-2-cyclopentyloxy-,
-2-cyclohexyloxy-,
-2-(2-methylcyclohexyloxy)-,
-2-tetrahydrofuryl-(3)-oxy-,
-2-benzyloxy-,
-2-(2-hydroxybenzyloxy)-,
-2-(4-methoxybenzyloxy)-2-allyloxy-,
-2-propargyloxy-,
-2-(3-methoxy-propyloxy)-,
-2-(2-propyloxy-ethoxy)- or
-2-(3-phenylallyloxy)-1,3,5-triazine.

To manufacture the dyestuffs of Formula II used as starting materials, diazotized 2-aminonaphthalene-trisulphonic acids, for example, 2-naphthylamine-1,3,7-, -1,5,7- and especially -3,5,7-, -4,6,8- or -3,6,8-trisulphonic acid, may be coupled with 3-ureidoanilines, for example, 6-methyl- or 6-methoxy-3-ureidoaniline, and especially with 3-ureidoaniline itself which is not further substituted, coupling being carried out in a slightly acid medium.

Diazotization of the aminonaphthaline-trisulphonic acids used in the manufacture of the dyestuffs of Formula I may be effected by methods known per se, for example, with a mineral acid, especially hydrochloric acid, and sodium nitrite. Coupling of the diazo compounds so obtained with the above-mentioned aniline derivatives that couple in 4-position is also carried out by methods known per se.

Condensation of the aminomonoazo dyestuffs so obtained with alkoxy-, dichloro- or dibromotriazines is carried out in a manner such that an exchangeable halogen atom still remains in the condensation product obtained.

The condensation process in accordance with the invention is advantageously carried out in the presence of an agent capable of binding acid, for example, sodium carbonate or sodium hydroxide, and under mild conditions, that is to say, for example, in an organic solvent or at a relatively low temperature in an aqueous medium.

The dyestuffs of the invention can be isolated and processed into useful dry dyeing preparations.

Isolation of the dyestuffs in accordance with the invention is preferably carried out at as low a temperature as possible by salting out and filtration. The filtered dyestuffs can be dried, if necessary, after the addition of extending agents and buffers, for example, mixtures of equal proportions of monosodium and disodium phosphate; drying is preferably carried out at not too high a temperature and under reduced pressure. In some cases the dry preparations of the invention can be made directly, without intermediate isolation of the dyestuffs, by spray-drying the whole manufacturing mixture.

The new dyestuffs of the invention are suitable for dyeing and printing a very wide variety of materials, for example, wool, silk, leather and polyamides and especially cellulosic fibrous materials, for example, linen, regenerated cellulose and especially cotton. They are especially suitable for application by printing processes, and also by the so-called "pad-stream" dyeing process in which the dyestuffs are applied to the material to be coloured by printing or padding and then fixed thereon by means of an agent capable of binding acid, if necessary, with the application of heat. This process, and the direct-dyeing process, by which many of the dyestuffs obtained in accordance with the process of the invention can be applied, yield valuable dyeings that are fast to washing; the printing process yields fast prints that are specially distinguished by their high colour intensity.

The dyeings and prints produced on cellulosic fibres with the new dyestuffs generally display a high degree of fixation, increased reactivity, good fastness to light and especially outstanding properties of wet fastness, especially very good fastness to washing; any unfixed dyestuff is very easy to remove.

The products obtained in accordance with the process of the invention have advantages compared with known dyestuffs having the most closely related structure and containing the residue of a 4,6-dichloro- (or -dibromo)-2-aminotriazine; for example, they are more suitable for the two-phase printing process.

The following example illustrates the invention, the parts and percentages being by weight unless otherwise stated. The relationship between parts by weight and parts by volume is the same as that between the gram and the cubic centimetre.

Similar dyestuffs may be obtained according to the process described in the above example using the compounds listed in columns I, II and III of the following table. The shades they yield on cotton are indicated in column IV.

| | I | II | III | IV |
|---|---|---|---|---|
| 1 | 2-naphthylamine-3,6,8-trisulphonic acid | 1-amino-3-ureido-benzene | 4,6-dichloro-2-ethoxy-1,3,5-triazine | Golden yellow. |
| 2 | do | do | 4,6-dichloro-2-propyloxy-1,3-5,triazine | Do. |
| 3 | do | do | 4,6-dichloro-2-(1-methylethoxy)-1,3,5-triazine | Do. |
| 4 | do | do | 4,6-dichloro-2-(2-ethoxyethoxy)-1,3,5-triazine | Do. |
| 5 | 2-naphthylamine-4,6,8-trisulphonic acid | do | 4,6-dichloro-2-methoxy-1,3,5-triazine | Do. |
| 6 | do | do | 4,6-dichloro-2-(1-methylethoxy)-1,3,5-triazine | Do. |
| 7 | do | 1-amino-3-ureido-6-methylbenzene | 4,6-dichloro-2-methoxy-1,3,5-triazine | Reddish yellow. |
| 8 | do | do | 4,6-dichloro-2-(2-ethoxyethoxy)-1,3,5-triazine | Do. |
| 9 | 2-naphthylamine-3,5,7-trisulphonic acid | 1-amino-3-ureido-benzene | 4,6-dichloro-2-ethoxy-1,3,5-triazine | Golden yellow. |
| 10 | 2-naphthylamine-3,6,8-trisulphonic acid | do | 4,6-dichloro-2-(2-methoxyethoxy)-1,3-5-triazine | Do. |
| 11 | do | do | 4,6-dichloro-2-(2-methoxypropoxy)-1,3,5-triazine. | Do. |
| 12 | do | do | 4,6-dichloro-2-(2-propyloxyethoxy)-1,3,5-triazine. | Do. |
| 13 | do | do | 4,6-dichloro-2-[2-(methoxyethoxy)-ethoxy]-1,3,5-triazine. | Do. |
| 14 | do | do | 4,6-dichloro-2-(1-methyl-2-methoxyethoxy)-1,3,5-triazine. | Do. |
| 15 | do | do | 4,6-dichloro-2-benzyloxy-1,3,5-triazine | Do. |
| 16 | do | do | 4,6-dichloro-2-cyclohexyloxy-1,3,5-triazine | Do. |
| 17 | do | 1-amino-3-ureido-6-methylbenzene | 4,6-dichloro-2-methoxy-1,3,5-triazine | Reddish yellow. |
| 18 | do | 1-amino-3-ureido-6-methoxybenzene | do | Orange. |
| 19 | do | do | 4,6-dichloro-2-(2-ethoxyethoxy)-1,3,5-triazine | Do. |
| 20 | do | 1-amino-3-ureido-benzene | 4,6-dichloro-2-butyloxy-1,3,5-triazine | Golden yellow. |
| 21 | do | do | 4,6-dichloro-2-(2-methylpropyloxy)-1,3,5-triazine. | Do. |
| 22 | do | do | 4,6-dibromo-2-methoxy-1,3,5-triazine | Do. |
| 23 | do | do | 4,6-dichloro-2-tetrahydrofuryloxy-1,3,5-triazine. | Do. |
| 24 | do | do | 4,6-dichloro-2-allyloxy-1,3,5-triazine | Do. |
| 25 | do | do | 4,6-dichloro-2-propargyloxy-1,3,5-triazine | Do. |
| 26 | do | do | 4,6-dichloro-2-(3-methoxy-propyloxy)-1,3,5-triazine. | Do. |

EXAMPLE 38.3 parts of 2-naphthylamine-3,6,8-trisulphonic acid are diazotized and then coupled with 15.1 parts of 1-amino-3-ureidobenzene at a pH of 4 to 5. 20 parts of 2,4-dichloro-6-methoxy-1,3,5-triazine are added to the solution of the aminoazo dyestuff so obtained, which has been neutralized, and the mixture is stirred for 2 hours at a temperature within the range of from 30 and 40° C. The mineral acid which is liberated thereby is gradually neutralized with a dilute sodium hydroxide solution. After the reaction, the dyestuff is salted out, isolated by filtration and dried. It dyes cellulosic fibres a golden yellow shade.

DYEING PROCEDURE 2 parts of the dyestuff obtained in the manner described in the example are dissolved in 100 parts of water in the presence of 0.5 part of sodium meta-nitrobenzenesulphonate. A cotton fabric is impregnated with the solution so obtained in a manner such that its weight is increased by 75% and it is then dried.

The fabric is then impregnated with a solution containing 5 grams of sodium hydroxide and 300 grams of sodium chloride per litre and having a temperature of 20° C., squeezed to a weight increase of 75%, steamed for 20 to 30 seconds at 100 to 101° C., rinsed, soaped for 15 minutes in a boiling 0.3% solution of a non-ionic detergent, rinsed and dried.

PRINTING PROCEDURE 2 parts of the dyestuff obtained in the manner described in the example are strewn into 100 parts of a stock thickening containing 45 parts of 5% sodium alginate thickening, 32 parts of water, 20 parts of urea, 1 part of sodium meta-nitrobenzenesulphonate and 2 parts of sodium bicarbonate while stirring rapidly.

The printing paste so obtained is applied to a cotton fabric on a roller-printing machine and then the printed fabric is steamed for 1 to 2 minutes in saturated steam. The material is then thoroughly rinsed in cold and hot water, during which any dyestuff that has not been chemically fixed on the fibre is easily removed, and then dried.

What is claimed is:

1. Monoazo dyestuff of the formula

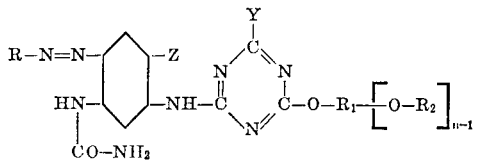

wherein R represents, 1,3,7-, 1,5,7-, 3,5,7-, 4,6,8-, or 3,6,8-trisulfonic acid naphthyl-2; Z represents hydrogen, low molecular alkyl or low molecular alkoxy; Y represents chloro or bromo; $R_1$ represents $C_{1-7}$alkyl, $C_{2-3}$ chloroalkyl, butenyl, carboxymethyl, ethylmercaptoethyl, phenoxyethyl, cyclohexylmethyl, acetyloxyethyl, furfuryl, tetrahydrofurfuryl, tetrahydrofuryl, ethoxymethylethoxyethyl, cyclopentyl, cyclohexyl, methylcyclohexyl, benzyl, hydroxybenzyl, methoxybenzyl, allyl, propargyl or phenylallyl; $R_2$ represents $C_{1-4}$alkyl or alkoxyalkyl having not more than 6 carbon atoms and $n$ is 1 or 2.

2. Monoazo dyestuff of the formula

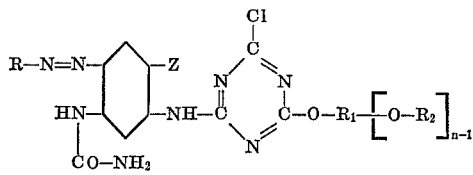

in which R and Z have the meanings given in claim 1, $R_1$ represents alkyl, $R_2$ represents alkyl or alkoxyalkyl, the two together having not more than 6 carbon atoms, and $n$ is 1 or 2.

3. Monoazo dyestuffs as claimed in claim 1 in which Y is chloro, $R_1$ is $C_{1-7}$alkyl, $R_2$ is alkoxyalkyl and $n$ is 1 or 2.

4. Monoazo dyestuff as claimed in claim 1 which contains 1-methylethoxy or 2-alkoxyethoxy in 2-position of the 1,3,5-triazine residue.

5. The dyestuff claimed in claim 1, wherein $R_2$ is ethoxyethyl.

6. The dyestuff claimed in claim 1, wherein $R_2$ is methoxyethyl.

7. The dyestuff claimed in claim 1, wherein $R_2$ is methoxypropyl.

8. Monoazo dyestuffs of the formula

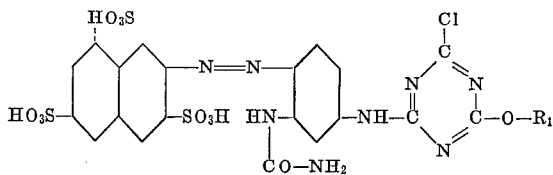

in which $R_1$ represents alkyl containing not more than 4 carbon atoms.

9. The dyestuff of claim 8 wherein $R_1$ is methyl.

10. The dyestuff claimed in claim 1, wherein $R_1$ is isopropyl.

11. Monoazo dyestuffs of the formula

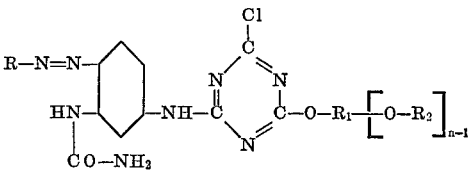

in which R represents 4,6,8-, 3,6,8- or 3,5,7-trisulphonic acid naphthyl-(2), $n$ is an integer not greater than 2, $R_1$ represents $C_{1-7}$alkyl and $R_2$ represents $C_{1-4}$alkyl or alkoxyalkyl residue, the two together having not more than 6 carbon atoms.

References Cited

UNITED STATES PATENTS 2,891,941   6/1959   Fasciati et al. _____ 260—153

JOSEPH REBOLD, Primary Examiner

D. M. PAPUGA, Assistant Examiner

U.S. Cl. X.R.

260—196, 248 CS; 8—41 R, 71